US010455969B2

(12) United States Patent
Dubief et al.

(10) Patent No.: US 10,455,969 B2
(45) Date of Patent: Oct. 29, 2019

(54) BEVERAGE DISPENSER WITH POWDER CONTAINER

(71) Applicant: NESTEC S.A., Vevey (CH)

(72) Inventors: Flavien Dubief, Neuchatel (CH); Lucio Scorrano, Yverdon-les-Bains (CH); Larry Baudet, Denges (CH); Kevin Jamolli, Bursins (CH)

(73) Assignee: Societe des Produits Nestle S.A., Vevey (CH)

( * ) Notice: Subject to any disclaimer, the term of this patent is extended or adjusted under 35 U.S.C. 154(b) by 448 days.

(21) Appl. No.: 15/106,395

(22) PCT Filed: Dec. 10, 2014

(86) PCT No.: PCT/EP2014/077235
§ 371 (c)(1),
(2) Date: Jun. 20, 2016

(87) PCT Pub. No.: WO2015/091162
PCT Pub. Date: Jun. 25, 2015

(65) Prior Publication Data
US 2017/0000288 A1   Jan. 5, 2017

(30) Foreign Application Priority Data

Dec. 20, 2013 (EP) .................................... 13198938

(51) Int. Cl.
*A47J 31/40* (2006.01)
*G01F 13/00* (2006.01)

(52) U.S. Cl.
CPC .......... *A47J 31/404* (2013.01); *G01F 13/005* (2013.01)

(58) Field of Classification Search
CPC .......... A47J 31/404; A47J 31/40; A47J 31/46; G01F 13/005; B67D 1/00; B67D 3/04;
(Continued)

(56) References Cited

U.S. PATENT DOCUMENTS 4,049,157 A * 9/1977 Carson ................... A47G 19/32
222/189.02
4,051,984 A * 10/1977 Ho ......................... A47G 19/12
222/471
(Continued)

FOREIGN PATENT DOCUMENTS

CN        2925347    *  7/2007
CN        2925347 Y    7/2007
(Continued)

OTHER PUBLICATIONS

Formal Translation of Wu CN2925347. Published 2007. (Year: 2007).*
(Continued)

*Primary Examiner* — Nikki H. Dees
*Assistant Examiner* — Ericson M Lachica
(74) *Attorney, Agent, or Firm* — K&L Gates LLP

(57) ABSTRACT

The invention concerns a beverage dispenser comprising: at least one refillable container (2) for storing soluble beverage powder, said container comprising: a tank (21), a dosing device (23), a discharge port (22) at the outlet of the tank, at least one beverage preparation unit (3) operatively linked to the container for preparing a beverage from the stored soluble beverage powder, wherein the discharge port (22) of the container comprises: an internal delivery tube (221) comprising a hollowing-out (222) in its bottom part, an external movable cover (223) comprising a hollowing-out (224) in its bottom part, said external movable cover covering at least a part of the internal delivery tube (221) and being movable between: a dosing position in which the both hollowing-outs (222, 224) of the internal delivery tube and of the external movable cover overlap each other, and a rest position in which the surface of the external movable cover
(Continued)

(223) overlaps and closes the hollowing-out (222) of the delivery tube.

11 Claims, 7 Drawing Sheets

(58) Field of Classification Search
CPC .. B65D 47/061; B65D 47/283; B65D 47/243; B65D 47/247; B65D 47/242; B65D 51/18; B65D 35/28
See application file for complete search history.

(56) References Cited

U.S. PATENT DOCUMENTS

| | | | | |
|---|---|---|---|---|
| 5,427,271 | A | * | 6/1995 | Wang .................. A47G 19/2272 220/255 |
| 2002/0014497 | A1 | * | 2/2002 | Bardin .................. A47J 31/404 222/63 |

FOREIGN PATENT DOCUMENTS

| | | | |
|---|---|---|---|
| CN | 200985278 | * | 12/2007 |
| CN | 200985278 | Y | 12/2007 |
| CN | 102349799 | A | 2/2012 |
| CN | 202477385 | U | 10/2012 |
| CN | 203226654 | U | 10/2013 |
| DE | 202009014256 | U1 | 3/2010 |
| JP | S57146998 | U | 9/1982 |
| JP | 2002263900 | A | 9/2002 |
| JP | 2003290996 | A | 10/2003 |
| WO | 2013014040 | | 1/2013 |

OTHER PUBLICATIONS

Formal Translation of Wang CN 200985278. Published 2007. (Year: 2007).*

Japanese Office Action for corresponding Japanese Application No. 2016-535089, dated Oct. 30, 2018; (11 pages).

* cited by examiner

BEVERAGE DISPENSER WITH POWDER CONTAINER

CROSS REFERENCE TO RELATED APPLICATIONS

The present application is a National Stage of International Application No. PCT/EP2014/077235, filed on Dec. 10, 2014, which claims priority to European Patent Application No. 13198938.6, filed Dec. 20, 2013, the entire contents of which are being incorporated herein by reference.

FIELD OF THE INVENTION

The present invention relates to beverage dispensers preparing beverages from a soluble powder stored in a container and from which a dose of powder is dispensed to prepare a beverage.

BACKGROUND OF THE INVENTION

Many beverages like espresso and other coffee beverages, milk beverages, chocolate beverages are prepared by mixing a beverage soluble powder with a diluent. Mixing devices are known for speedier preparation of such beverages by mixing the beverage soluble powder with the diluent, such as water. These devices can comprise a dissolution chamber in which the soluble component and the diluent are fed. The diluent can be introduced into the dissolution chamber in order to create a whirlpool to efficiently dissolve the soluble powder in the hot water or the hot diluent can be introduced under the form of jets that provides mixing, dissolving and frothing. The mixture can also eventually be frothed by a whipper in the dissolution chamber to reconstitute the beverage and produce foam. The beverage is then usually evacuated into a receptacle for drinking. These devices can also mix the beverage soluble powder with the diluent in a drinking cup, usually a single use cup. In that case the soluble food component is introduced in the cup and the diluent is introduced under the form of jets that provides mixing, dissolving and/or frothing.

Whatever the way the powder and the diluent are mixed together the beverage soluble powder is usually stored in a container placed above the dissolution chamber opened mouth and a dosing device like a screw or an auger doses and delivers the beverage soluble powder which falls in the dissolution chamber or the drinking cup. Diluent is simultaneously fed to the dissolution chamber so that dissolution occurs. Several issues exist with such a configuration.

First the soluble powder frequently comprises fine particles which can easily flies when powder falls from the container outlet to the dissolution chamber. These fine particles dirty the internal housing of the dispenser.

Secondly, the vapour and humidity generated during the beverage preparation in the dissolution chamber or the drinking cup raises and surrounds the container outlet. If another beverage is rapidly prepared after another one then the new dose of powder delivered by the container reacts partially with the humidity and creates non hygienic deposits around the outlet. After a period of time, this process can lead to an accumulation of moisture on the discharge port of the container. As the quantity of soluble powder accumulating on discharge port increases over time, the outlet becomes increasingly constricted. Ultimately, this can result in the outlet becoming completely clogged, which results in the complete failure of the dosing device. Additionally, the soluble powder adhering to the discharge port is constantly moistened by the rising vapours. This can result in the soluble powder caking and even turning mouldy or growing harmful bacteria after extended use. This may lead to the dosing device rendering the powder ingredient inconsumable.

Consequently it has been proposed to close the discharge port when no powder is dosed and when the powder is mixed with water in the dissolution chamber.

EP-A1-331 271 has proposed a dispenser with a powder container comprising a metering screw, drivable by an electromotor, the metering screw being surrounded by a tubular member. The container comprises a closing valve at the discharge end of the metering screw tube, said closing valve being activated by a driving pin extending through the longitudinal axis of the metering screw and displaceable by a solenoid connected in the starter of the electromotor. Yet the position of the driving pin through the longitudinal axis of the metering screw is complex. It is necessary to manufacture of a specific metering screw with a central void dedicated to the position of the driving pin inside.

In U.S. Pat. No. 4,610,378 a container for food powders, particularly for automatic beverage distributing machines, comprises a screw member revolving inside a duct bearing a delivering mouth which is closed, in non-working conditions, by a plate closing member. The closing member is opened by the end of the screw member during its rotational motion at the dosing operation. During said dosing operation the delivering mouth is successively opened and closed which does not enable a rapid and fluid dosing and powder is compressed.

WO 2014/115061 has proposed an extruder for use in a dispenser of loose product that is substantially insensitive to operation in a moist environment. The extruder includes a screw that is both rotatably and translatably received in a bore of the dispenser such that it is axially movable along the longitudinal axis of the bore between a first position and a second position. The extruder includes a sealing device that is configured to releasably fluidtightly seal a portion of the bore interconnecting the product inlet and the product outlet in dependence of the axial position of the screw. The configuration of the extruder is such that, in said first axial position of the screw, the sealing device fluidtightly seals the portion of the bore interconnecting the product inlet and the product outlet. In the second axial position of the screw, in contrast, the sealing device does not fluidtightly seal the portion of the bore interconnecting the product inlet and the product outlet, and rotation of the screw effects the continuous extrusion or discharge of loose product, supplied at the product inlet, from the product outlet. Consequently humidity due to the hot water used to prepare beverage cannot rise in the discharge opening of the extruder since the discharge opening can be closed during beverage preparation.

Although this extruder solves the problem of humidity arising in the discharge opening during beverage preparation, this extruder does not take into account the problem of keeping the dosing of loose product, like powder, consistent. Yet the consistent preparation of a beverage is essential with a beverage dispenser. Customers expect to get always the same beverage when they order the same beverage at different times with the same dispenser. An important factor of control of a beverage consistency consists in a consistent dosing of the soluble beverage powder during beverage preparation. The extruder of WO 2014/115061 does not enable a consistent dosing because the back rotation of the screw seems to create a void in the outlet of the extruder which affects the following dosing operation since no loose product is dispensed by the extruder at the beginning of its activation. Moreover this extruder is made of complex mechanical pieces which increase its costs of production.

A solution has been proposed in EP 1 176 402 in which the outlet of the container is opened only when the powder is dosed and delivered in order to prepare a beverage and is closed the rest of the time. Consequently humidity is avoided from reaching the outlet of the powder container and from entering inside the container outlet. The risk of clogging in the container outlet is limited.

Yet the way the above solution is implemented presents some defaults. In particular the outlet is closed by a sealing element operated by a gear train comprising intermeshing gears connected to a transmission rod which is in turn connected to a motor. The gear train is positioned close to the container outlet and is not protected again humidity rising from the dissolution chamber or the drinking cup. Consequently if powder fines flies around the powder outlet and deposit on the gear train, the reaction of powder fines and humidity could cause the failure or blockage of the gear train. Actually the dispenser described in EP 1 176 402 is a relatively small dispenser that is not conceived for significant preparation of beverages during the whole day.

Nowadays cleaning is a key aspect of beverage dispensers. Actually cleaning is a time consuming task. There is need for decreasing the time for the cleaning operation to limit the period of time during which the dispenser is not operable. Moreover people operating the dispensers are less and less trained, so there is a need for a dispenser that can be cleaned in a very easy way.

There is a need for improving powder container outlet closure and improving cleaning of the dispenser.

An object of the invention is to address at least some of the drawbacks of the prior art dispensers or at least to provide an alternative thereto.

It would be advantageous to provide a beverage dispenser presenting a powder container of which outlet prevents humidity from rising in the container.

It would be advantageous to provide a beverage dispenser presenting a powder container and a device for alternatively closing and opening the powder container outlet.

It would be advantageous to provide a beverage dispenser presenting a powder container and a device for alternatively closing and opening the powder container outlet, said device being protected from humidity.

It would be advantageous to provide a beverage dispenser presenting a powder container and a device for alternatively closing and opening the powder container outlet, wherein the mechanism for closing and opening the powder container outlet does not complicate the cleaning operation of the dispenser.

SUMMARY OF THE INVENTION

According to a first aspect, there is provided a beverage dispenser comprising:
at least one container for storing soluble beverage powder, said container comprising:
  a tank,
  a discharge port at the outlet of the tank,
  a dosing device configured for displacing a dose of soluble beverage powder to the discharge port,
at least one beverage preparation unit operatively linked to the container for preparing a beverage from the stored soluble beverage powder, wherein the discharge port of the container comprises:
  an internal delivery tube comprising a hollowing-out in its bottom part and closed at its end next to the hollowing-out,
  an external movable cover covering at least a part of the internal delivery tube and comprising a hollowing-out in its bottom part, said external movable cover being movable between:
    a dosing position in which both hollowing-outs of the internal delivery tube and of the external movable cover overlap each other, and
    a rest position in which the surface of the external movable cover overlaps and closes the hollowing-out of the delivery tube
wherein the dispenser comprises an actuator able to exert a force on the external movable cover so as to move it between the rest position and the dosing position, said actuator comprising two rods, and
  each of said rod is configured for engaging at its one first end a lateral side of the external movable cover, and
  each of said rod is extending along the lateral side of the tank, and
  each of said rod is configured for being engageable at its one second end by a motorised actuator to create a translation movement of the rod.

The beverage dispenser of the present invention comprises at least one container for storing soluble beverage powder. In the present application the term powder can cover powders, pellets or granules of soluble beverage ingredients. According to the preferred mode, the beverage ingredients are soluble ingredients like soluble coffee, tea, chocolate, milk, sugar, flavoured powders, . . . The container is usually positioned in a housing. The container is usually non disposable and can be refilled.

The container generally comprises a device for dosing the soluble beverage powder from the container. The dosing device is preferably a rotatable volumetric dosing device:
  longitudinally extending through the bottom of the reservoir, and
  configured for displacing a volume of powder longitudinally through the bottom of the reservoir.

It is preferably a rotatable volumetric dosing device placed at the bottom of the tank. Preferably the volumetric dosing device is a screw auger or a spring auger. The volumetric dosing means can be a spring auger with a solid insert located within the screw in a rear portion of the auger. The insert can present a decreasing cross section along the spring length from the rear end to the front end.

In general the rotatable volumetric dosing device is actuated by a motor.

The dispenser also comprises at least one beverage preparation unit that prepares a beverage from at least one soluble beverage powder dose stored in the container. The beverage preparation unit is also usually positioned in the housing of the dispenser. The beverage preparation unit usually comprises one means for contacting a dose of the beverage powder with a diluent. It can be a diluent jet(s) head, a mixing bowl, a whipper bow. The beverage preparation unit is generally positioned or operatively linked to the at least one containers so that it can receive a dose of powder therefrom and subsequently enables contact of the dose with a diluent and prepare a beverage. Depending on the nature of the beverage powder one preparation unit can be associated to only one container (for example if the powder requests a particular mixing in a dedicated preparation unit or if two powders should not be mixed together (cross-contamination issue)) or one preparation unit can be associated to several containers (for example the same preparation unit can be used for a standard coffee and for decaffeinated coffee).

The at least one container of the dispenser comprises a discharge port placed at the outlet of the container. The discharge port is configured for enabling either the closure of the outlet of the container or the opening of the outlet of the container. The discharge port is configured for opening the outlet of the container when it is activated and for closing the outlet of the container at rest.

According to the invention the discharge port of the at least one container comprises:
- an internal delivery tube comprising a hollowing-out in its bottom part,
- an external movable cover comprising a hollowing-out in its bottom part, said external movable cover covering at least a part of the internal delivery tube and being movable between:
  - a dosing position in which both hollowing-outs of the internal delivery tube and of the external movable cover overlap each other, and
  - a rest position in which the surface of the external movable cover overlaps and closes the hollowing-out of the delivery tube.

Generally the internal delivery tube of the discharge port is fixed. Generally it is attached to the outlet of the container tank. According to an embodiment it can be part of the outlet of the container tank. It usually presents the shape of a cylinder. The base at the end of the internal delivery tube is closed near the outlet extremity so that soluble beverage powder dose displaced by the dosing device can be evacuated by the hollowing-out in the delivery tube only. Preferably the hollowing-out is next to the end of the tube. According to an embodiment, the internal delivery tube can comprise a partial weir, preferably a half moon weir, obstructing the lower internal part of the tube in front of the hollowing-out.

The discharge port also comprises an external movable cover. By external it is meant that this cover surrounds the internal delivery tube delivering the powder from the container tank. This external cover also comprises a hollowing out in its bottom part. This external cover is movable so that, according to its position, its hollowing-out can overlap or not the hollowing-out of the delivery tube and consequently enables the opening or the closing of the discharge port for delivering powder.

Preferably the external movable cover comprises at least one opening at its end covering the end of the internal delivery tube next to the hollowing out. This opening avoids that some beverage powder or fines remain trapped between the ends of the tube and the cover during the movement of the movable cover. Powder or fines can escape from the movable cover through the opening.

The external movable cover moves according to a translation movement. The translation movement is preferably along the axial direction of the internal delivery tube. This direction is the direction of the axis of the spring auger. This alignment of the axis of the directions of the different movements linked to the container (dosing device movement, discharge port movement) enables a better control of the volume of the container and an optimal positioning of the motors for the movements. Preferably the beverage dispenser comprises an actuator that is able to exert a force on the external movable cover so as to move it between the rest position and the dosing position.

The actuator comprises two rods, and
each of the rods are configured for engaging at its one first end a lateral side of the external movable cover, and
each of the rods extending along the lateral side of the tank, and
each of the rods being configured for engaging at its one second end by a motorized actuator.

The motorized actuators of both rods are preferably able to create the same translation movement of both rods simultaneously. Preferably the motorised actuator is a pin translating back and forth between the dosing and the rest position. Preferably the pin pushes the rod during dosing operation and the pin exerts no action on the rod at rest.

Both lateral sides of the external movable cover can comprise a sleeve in which the first end of one of the rods is engaged and in which a spring is positioned. The spring is positioned between the end of the sleeve and the first end of the rod. The length of the rods and the force of the springs are set so that at rest position the second ends of the rods do not extend beyond the container length. Consequently in the embodiment where the container is removable from the dispenser, then, when the container is removed from the dispenser, the second end of the at least one rod remains in the container volume and does not extend outside the container length.

The discharge port preferably comprises a discharge port protecting device covering the engagement between the first ends of the rods and the lateral sides of the external movable cover.

The container can comprise a rods protecting device covering the rods extending along the lateral side of the tank too.

The discharge outlet can be dismountable from the tank outlet.

According to a second aspect there is provided a method for preparing a beverage with a dispenser such as described hereabove comprising the steps of:

a)—activating the dosing device to deliver a dose of beverage powder through the discharge port of the tank inside the beverage preparation unit, b)—preparing the beverage inside the beverage preparation unit by mixing the dose of beverage powder with a diluent, wherein during step b) of beverage preparation the surface of the external movable cover of the discharge port overlaps and closes the hollowing-out of the delivery tube of the discharge port.

According to the preferred embodiment the both hollowing-outs of the internal delivery tube and of the external movable cover overlap each other during the dosing step a) only.

In the present application the terms "internal", "external", "rear", "front", "bottom" and "lateral" are used to describe the relational positioning of features of the invention. These terms should be understood to refer to the container in its normal orientation when positioned in a beverage preparation dispenser for the production of a beverage as shown in the figures.

The above aspects of the invention may be combined in any suitable combination. Moreover, various features herein may be combined with one or more of the above aspects to provide combinations other than those specifically illustrated and described. Further objects and advantageous features of the invention will be apparent from the claims, from the detailed description, and annexed drawings.

BRIEF DESCRIPTION OF THE DRAWINGS

The characteristics and advantages of the invention will be better understood in relation to the following figures.

DETAILED DESCRIPTION OF THE DRAWINGS

Figure 1:
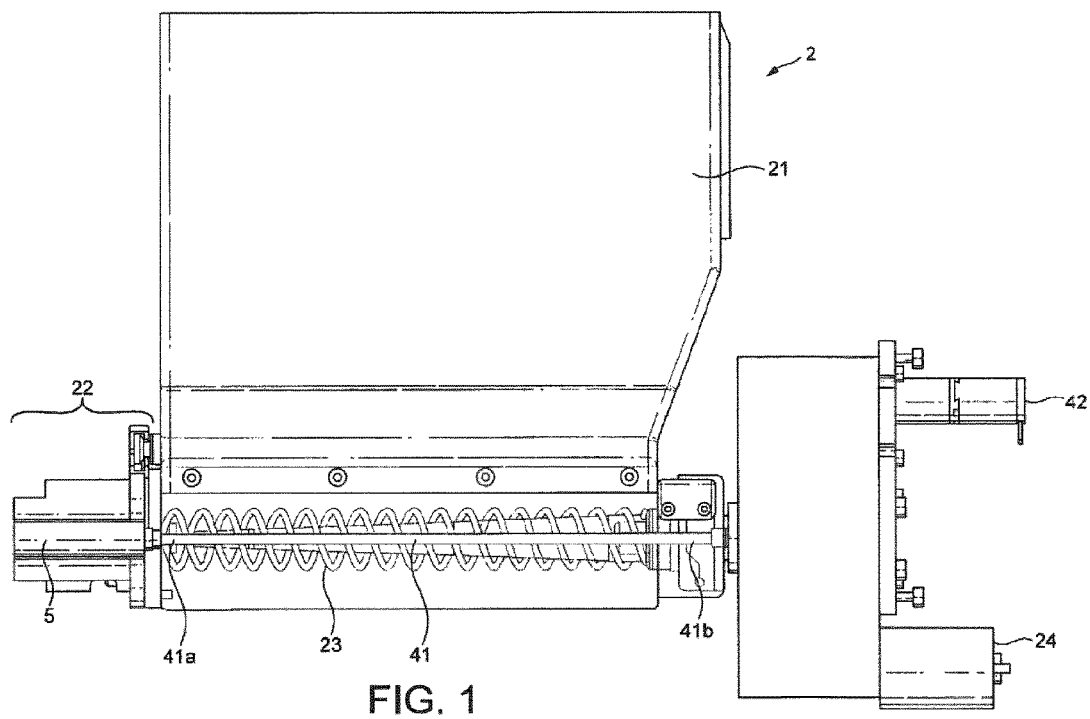
FIG. 1 is a partial view of a dispenser according to the present invention illustrating the soluble beverage powder container.

FIG. 1 illustrates a soluble beverage powder container 2 of a dispenser according to the present invention. The container 2 comprises a discharge port 22 according to the present invention. The container comprises a tank 21 in which the soluble beverage powder is stored. The internal bottom the container is transparent to make apparent the dosing device that is a spring auger 23 which drives the bulk soluble beverage powder to the outlet of the tank and then to the discharge port 22. An insert 25 is positioned in the spring auger 23. This insert presents a decreasing cross section along the spring length from the rear end to the front end (that is according to the direction of displacement of the powder dose) as better illustrated in following FIGS. 2a and 3a.

Two motors are operatively linked to the container. A motor 24 actuates the rotation of the spring auger 23 which moves the powder from the rear side of the container to the front side in direction of the discharge port 22. Another motor 24 actuates the translation of the rods 41 from the rear side to the front side to open the discharge port 22.

Figure 2A:
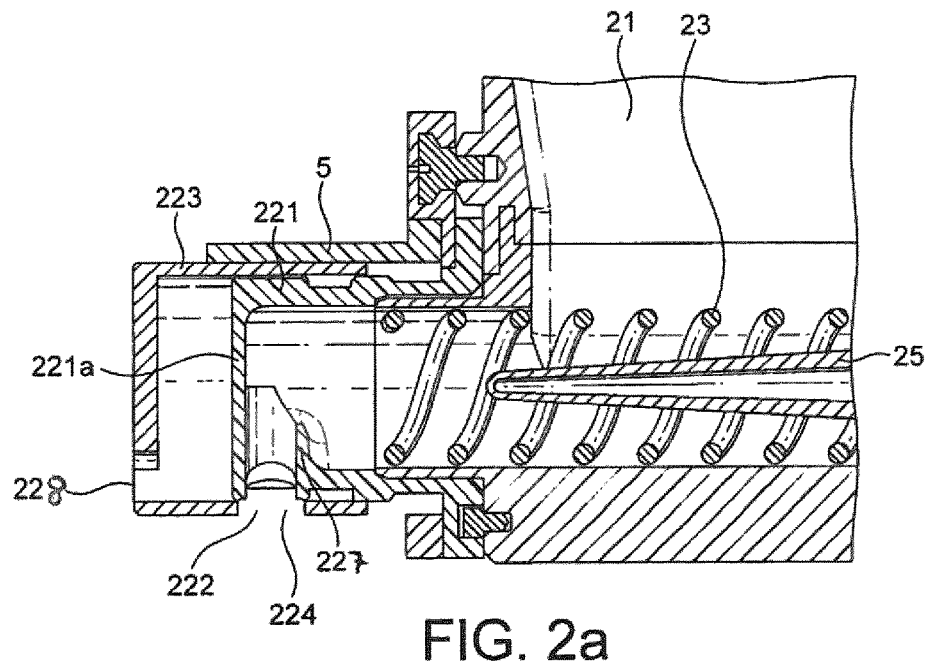
FIG. 2a is a section view of the discharge port of the container of FIG. 1 in its opened position.

FIG. 2a is a magnified section view of the tank outlet and the discharge port 22. The discharge port comprises:
an internal delivery tube 221 comprising a hollowing-out 222 in its bottom part,
an external movable cover 223 comprising a hollowing-out 224 in its bottom part.

The internal delivery tube 221 is fixed and attached to the tank outlet. The external movable cover 223 surrounds the internal delivery tube 221 and is able to slide around it according to a translation movement between two positions.

The dimensions of the both hollowing outs 222, 224 and the relative positions of the internal delivery tube 221 and the external movable cover 223 when assembled are configured so that the external movable cover 223 covers at least a part of the internal delivery tube 221 and the hollowing-outs 222, 224 overlap each other in one first position and cannot in the other second position. Then the dimension of the hollowing out 224 of the external movable cover is configured for overlapping at least the hollowing-out 222 of the delivery tube.

In FIG. 2a the discharge port is represented in the second dosing position where the two hollowing outs 222, 224 overlap each other and enable the dispensing of the soluble beverage powder which is pushed by the activation of the dosing means 23.

The internal delivery tube presents a weir 227 that obstructs the bottom part of the tube section in front of the hollowing-out according to the powder movement direction.

Figure 2B:
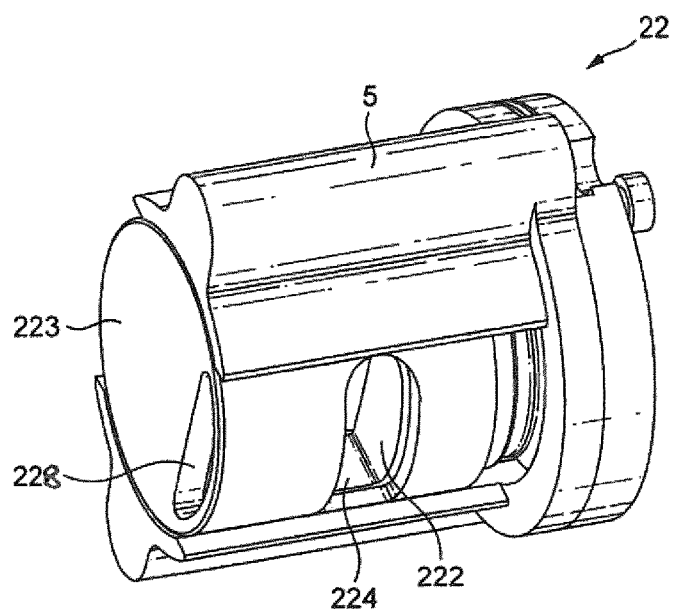
FIG. 2b is a perspective view of the discharge port of the container of FIG. 2a in its opened position.

FIG. 2b is a perspective view of the discharge port 22 only in the same position as in in FIG. 2a. The discharge port 22 comprises a cover 5 partially covering lateral sides of the discharge port. The role of this cover will be explained in relation with FIG. 4.

Figure 3A:
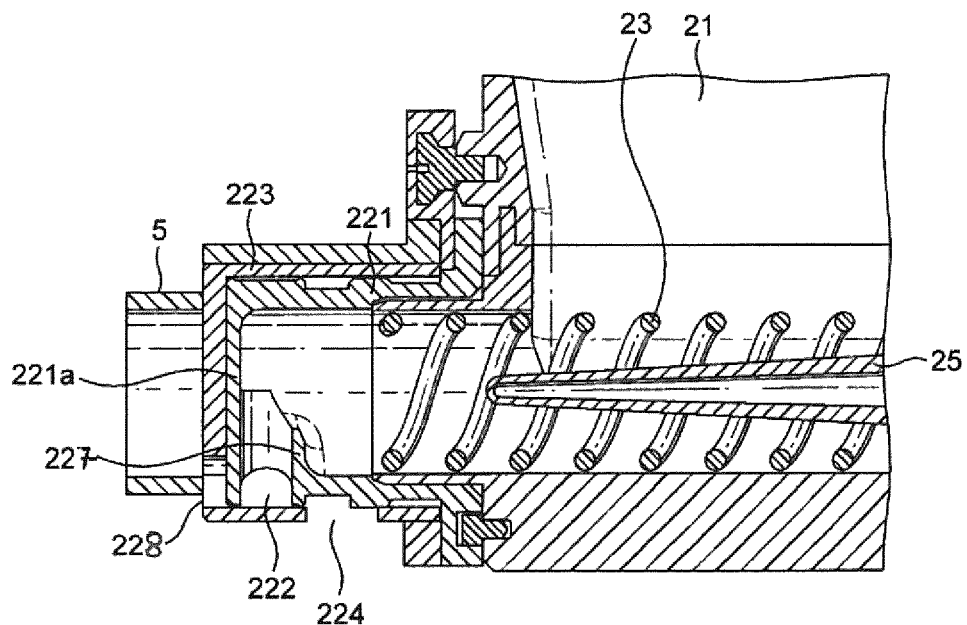
FIG. 3a is a section view of the discharge port of the container of FIG. 1 in its closed position.

FIG. 3a is magnified section view of the tank outlet and the discharge port 22 as in FIG. 2a except that that the external movable cover 223 is in the first rest position where the two hollowing outs 222, 224 do not overlap each other and do not enable the dispensing of the soluble beverage powder.

Figure 3B:
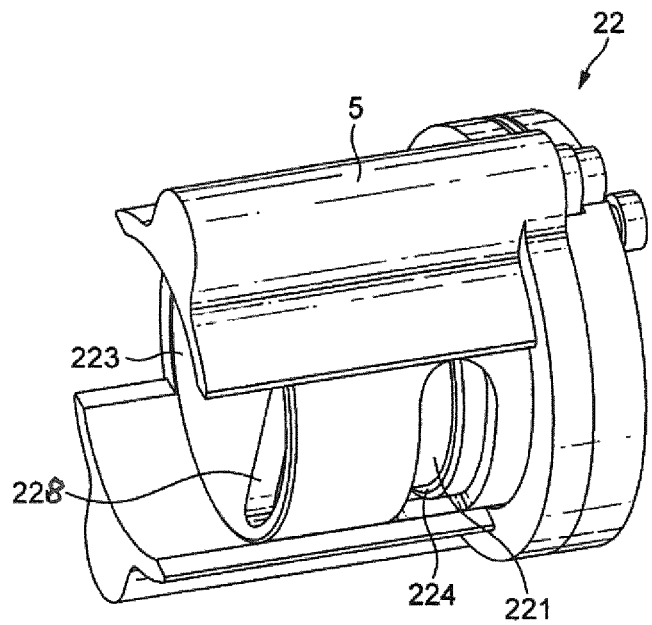
FIG. 3b is a perspective view of the discharge port of the container of FIG. 3a in its closed position.

FIG. 3b is a perspective view of the discharge port 22 only in the same position as in in FIG. 3a.

FIGS. 2a, 2b, 3a, 3b illustrates the scraping action of the movable cover 223 when it slides to close the hollowing out 222 of the internal delivery tube.

Moreover if powder slides in the space between the end 221a of the internal delivery tube and the end of the external movable cover, this powder can be evacuated through the opening 228 when the external movable cover moves to close the hollowing out 222 in the internal delivery tube as illustrated in FIG. 3a. Powder can flow downwards in the beverage preparation unit.

Figure 4:
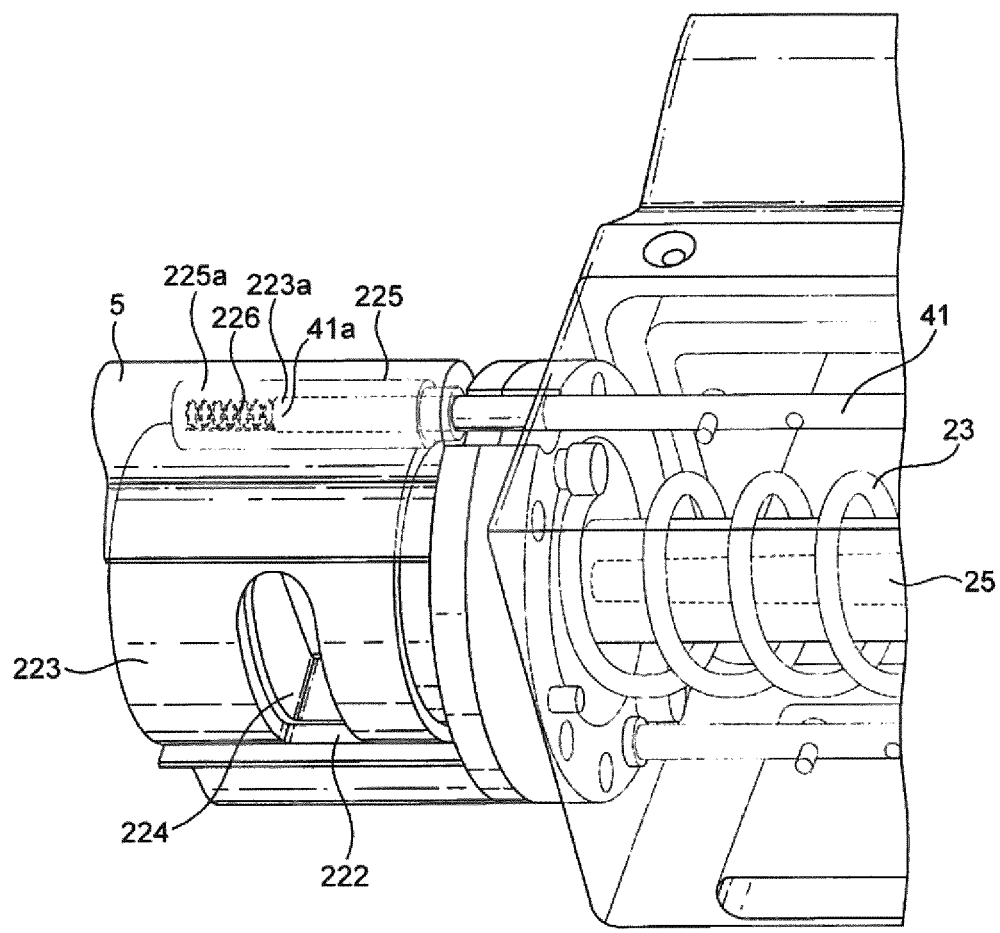
FIG. 4 is a view of the discharge port of the container of FIG. 2a from the bottom.

FIG. 4 illustrates the discharge port 22 in the same position as in FIGS. 2a, 2b and wherein the cover 5 has been made transparent to illustrate the way the movable external tube 223 is actuated. On each of its lateral sides 223a the movable external tube 223 present a sleeve 225 in which the first end 41a of a rod can be engaged. Consequently a back and forth movement of the rod 41 activates the back and forth movement of the movable external tube 223. The rod 41 is defined so that its first end 41a does not reach the end of the internal of the sleeve: actually a space 225a at the end of the sleeve is provided with a spring 226 that exerts a pressure on the first end 41a of the rod. This spring 226 enables the rod to come back to its rest position when no more force is exerted on its second end. In FIG. 4 the spring 226 is compressed by the translation of the rod 41 from the back to the front of the canister along the canister axial direction. The cover 5 protects the sleeves 225 and the first ends 41 a of the rods 41 from the humidity and the powder fines.

As illustrated in FIG. 1 the rod 41 extends along the lateral side of the container bottom and the second end 41b of the rod is indirectly engaged with a motor 42 that can push both rods back and forth simultaneously.

For each rod the second end 41b can be engaged by a motorized actuator that provides a back and forth translation according to the axial direction of the canister. The actuator can be a pin that engages the end 41b of the rod. The pin can be translated by any known method like engagements of the motor with toothed gears, rack rail, threaded device and screw, for example. According to a particular embodiment the same motor can be used for actuating the dosing device and the discharge outlet opening.

Figure 5:
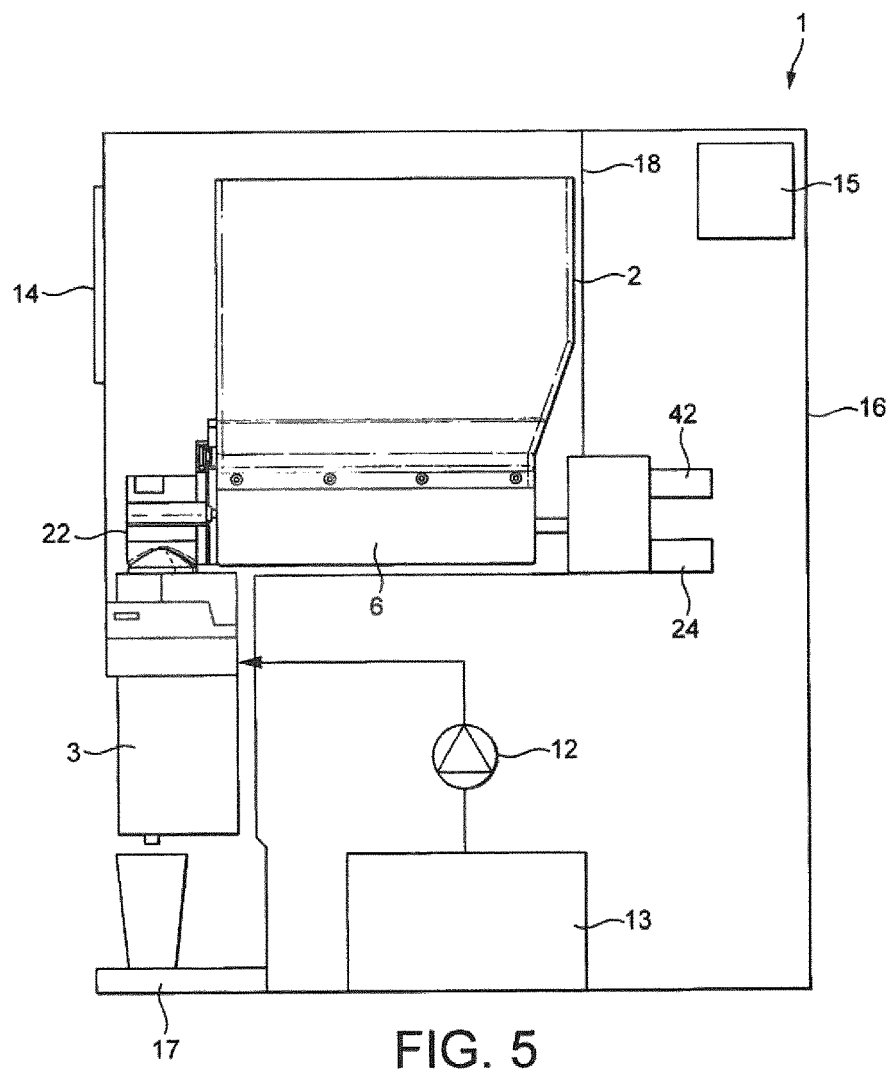
FIG. 5 is a schematic diagram of a beverage dispenser according to the present invention.

In FIG. 5 the soluble beverage powder container 2 is represented inside the beverage dispenser 1. The dispenser comprises a housing 16 in which at least one refillable container 2 is positioned. The container comprises the discharge port 22 at one extremity of the bottom of its tank. The container 2 comprises the dosing device 23 for dosing and moving a dose of powder through the discharge port 22. This dosing device 23 is actuated by a motor 24. The discharge port 22 is configured for being opened or closed further to the action of the rods 41 and the motor 42.

The discharge port 22 is oriented so as to deliver the soluble beverage powder in a beverage preparation 3 for contacting a dose of beverage powder with a diluent. The diluent is supplied by a fluid system comprising a boiler 13, a pump 12 and a heater. The beverage preparation unit 3 delivers the beverage in cup placed in a dispensing area 17. The dispenser comprises an internal back panel 18 enabling the separation of the front maintenance area from the back service area. The maintenance area comprises the powder container and the beverage preparation unit, it is an area that has to be frequently cleaned. The service area comprises the fluid system and the electrics devices of the dispenser; it does not need to be cleaned particularly.

Figure 6A:
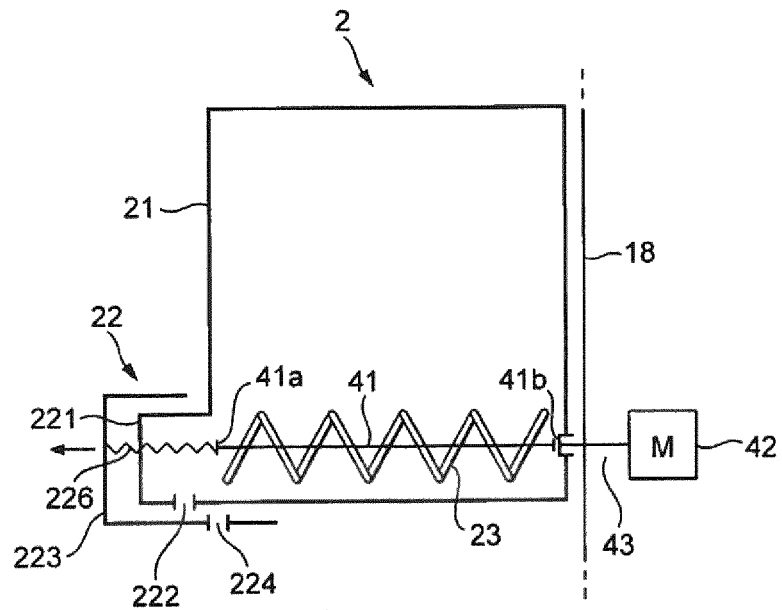
FIGS. 6a and 6b are schematic section views of the container respectively during rest and dosing position.
Figure 6B:
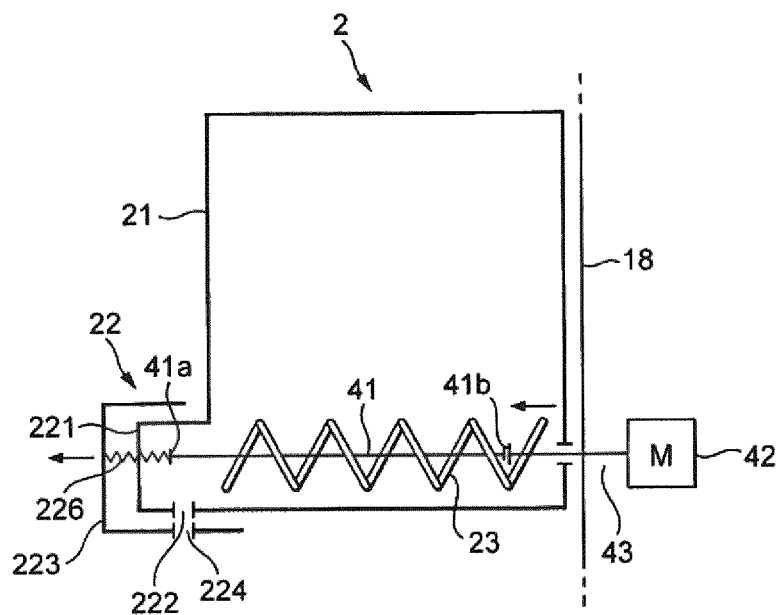

FIGS. 6a and 6b are schematic section views of the container illustrating the movement of one rod 41, of the spring 226 cooperating with the first end of the rod 41a and of the motorized actuator 43 cooperating with the second end of the rod 41b.

Figure 7A:
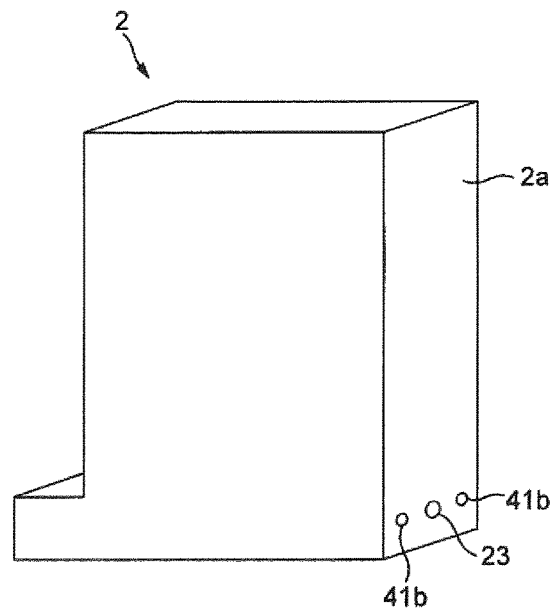
FIGS. 7a and 7b are schematic perspective views of the back of a container and of the front of the internal back panel of the dispenser.

FIG. 7a is a schematic view of the container 2 according to the invention. It is made apparent that the second ends 41b of the rods do not extend beyond the back surface 2a of the container.

Figure 7B:
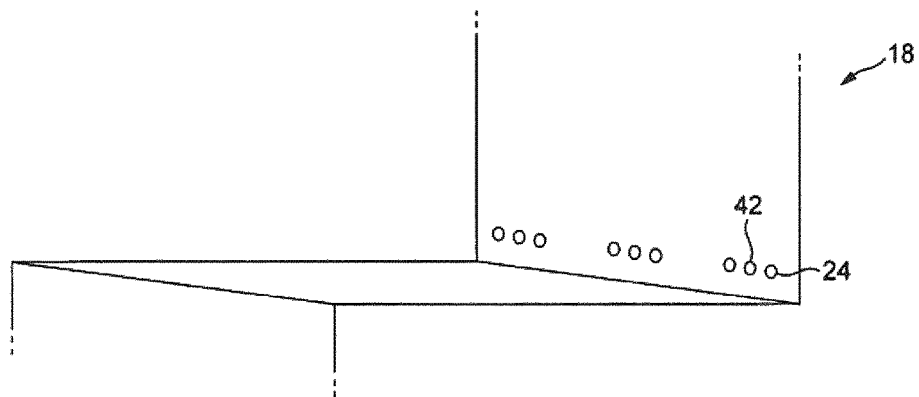

Similarly FIG. 7b is a schematic view of the internal back wall 18 of the dispenser according to the invention. It is made apparent that the motorized actuators of the rods do not extend beyond the back wall of the container. Consequently said surface can easily cleaned.

The beverage dispenser of the present invention presents the advantage of preventing humidity from flowing in the soluble beverage powder container through the tank outlet when a beverage is prepared.

Another advantage of the present invention is that the means for actuating the closure of the container outlet can be protected from humidity and powder fines deposits.

Although the invention has been described with reference to the above illustrated embodiments, it will be appreciated that the invention as claimed is not limited in any way by these illustrated embodiments.

Variations and modifications may be made without departing from the scope of the invention as defined in the claims. Furthermore, where known equivalents exist to specific features, such equivalents are incorporated as if specifically referred in this specification.

As used in this specification, the words "comprises", "comprising", and similar words, are not to be interpreted in an exclusive or exhaustive sense. In other words, they are intended to mean "including, but not limited to".

LIST OF REFERENCES IN THE DRAWINGS 1 beverage dispenser
2 container
2a container back surface
21 tank
22 discharge port
221 internal delivery tube
221a end of the internal tube
222 hollow-out of internal tube
223 external cover
223a lateral side of external cover
224 hollow-out of external cover
225 sleeve
225a space
226 spring
227 weir
228 opening
23 dosing device
24 motor of the dosing device
25 insert
3 dissolution chamber
41 rod
41a first end of rod
41b second end of rod
42 rod motor
43 motorized pin
5 discharge port cover
6 container bottom cover
12 pump
13 boiler
14 user interface
15 control unit
16 housing
17 dispensing area
18 internal back panel

The invention claimed is:

1. A method for preparing a beverage with a dispenser comprising at least one container for storing a soluble beverage powder, the at least one container comprising a tank, a discharge port at an outlet of the tank, a dosing device configured for displacing a dose of the soluble beverage powder to the discharge port, at least one beverage preparation unit operatively linked to the at least one container for preparing the beverage from the stored soluble beverage powder, the discharge port of the at least one container comprises an internal delivery tube comprising a hollowing-out in a bottom part of the internal delivery tube and closed at an end of the internal delivery tube next to the hollowing-out, an external movable cover covering at least a part of the internal delivery tube and comprising a hollowing-out in a bottom part of the external movable cover, the external movable cover being movable according to a translation movement between a dosing position in which both of the hollowing-outs of the internal delivery tube and of the external movable cover overlap each other, and a rest position in which a surface of the external movable cover overlaps and closes the hollowing-out of the internal delivery tube, the dispenser comprises an actuator configured to exert a force on the external movable cover to move the external movable cover between the rest position and the dosing position, the actuator comprising two rods, and each of the two rods is configured for engaging at a respective lateral side of the external movable cover at a first end of each respective rod, and each of the two rods extends along the respective lateral side of the tank, and each of the two rods is configured to engage a motorised actuator at a second end of each respective rod to create a translation movement of each respective rod, the method comprising the steps of:
   a) activating the dosing device to deliver the dose of the soluble beverage powder through the discharge port of the tank inside the at least one beverage preparation unit; and
   b) preparing the beverage inside the at least one beverage preparation unit by mixing the dose of the soluble beverage powder with a diluent;
   wherein, during step b), the surface of the external movable cover of the discharge port overlaps and closes the hollowing-out of the internal delivery tube of the discharge port.

2. The method according to claim 1, wherein both of the hollowing-outs of the internal delivery tube and of the external movable cover overlap each other during step a) only.

3. The method according to claim 1, wherein the external movable cover comprises at least one opening at an end of the external movable cover that covers an end of the internal delivery tube next to the hollowing-out of the external movable cover.

4. The method according to claim 1, wherein each of the first ends of each of the rods indirectly engages the external movable cover through a spring.

5. The method according to claim 1, wherein the motorised actuator is a pin translating back and forth between the dosing position and the rest position.

6. The method according to claim 5, wherein the at least one container is removable from the dispenser and, when the at least one container is removed, the pin is in the rest position and does not extend beyond a back panel of the dispenser.

7. The method according to claim 1, wherein each of the respective lateral sides of the external movable cover comprises a sleeve in which a spring is positioned, the sleeve configured for engaging each of the first ends of each respective rod.

8. The method according to claim 1, wherein the discharge port comprises a port-protecting device covering an engagement location between each of the first ends of each respective rod and each of the respective lateral sides of the external movable cover.

9. The method according to claim 1, wherein the at least one container comprises a rods-protecting device covering each of the two rods and extending along each of the respective lateral sides of the tank.

10. The method according to claim 1, wherein the at least one container is removable from the dispenser and, when the at least one container is removed, each of the second ends of each respective rod remains in a volume of the at least one container.

11. A method for preparing a beverage with a dispenser comprising at least one container for storing a soluble beverage powder, the at least one container comprising a tank, a discharge port at an outlet of the tank, an external movable cover covering at least a part of an internal delivery tube and comprising a hollowing-out in a bottom part of the external movable cover, the external movable cover being movable according to a translation movement between a dosing position in which a hollowing-out of the internal delivery tube and the hollowing out of the external movable cover overlap each other, and a rest position in which a surface of the external movable cover overlaps and closes the hollowing-out of the internal delivery tube, and an actuator configured to exert a force on the external movable cover to move the external movable cover between the rest position and the dosing position, the actuator comprising two rods, and each of the two rods is configured for engaging at a respective lateral side of the external movable cover at a first end each respective rod, and each of the two rods extends along a respective lateral side of the tank, and each of the two rods is configured to engage a motor at a second end of each respective rod to create a translation movement of each respective rod, the method comprising the steps of:

a) activating a dosing device configured for displacing a dose of the soluble beverage powder to the discharge port to deliver the dose of the soluble beverage powder through the discharge port at the outlet of the tank inside at least one beverage preparation unit, the discharge port of the at least one container comprises the internal delivery tube comprising the hollowing-out in the bottom part of the internal delivery tube and closed at an end of the internal delivery tube next to the hollowing-out of the internal delivery tube; and b) preparing the beverage inside the at least one beverage preparation unit by mixing the dose of the soluble beverage powder with a diluent, the at least one beverage preparation unit operatively linked to the at least one container for preparing the beverage from the stored soluble beverage powder;

wherein, during step b), the external movable cover is in the rest position.

* * * * *